June 6, 1944.　　　P. H. PLANETA　　　2,350,922
SUPPORT
Filed Oct. 16, 1941
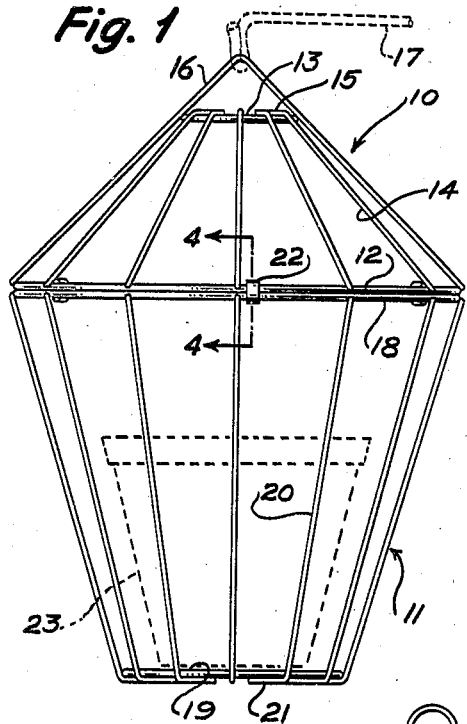
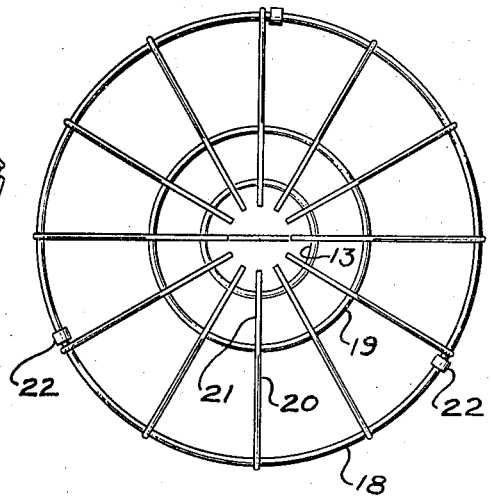
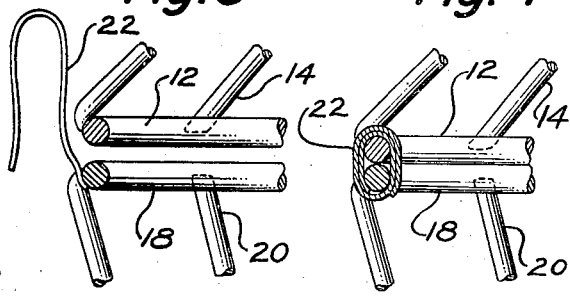
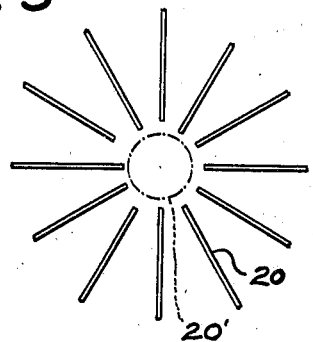
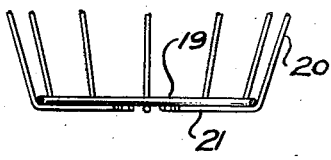
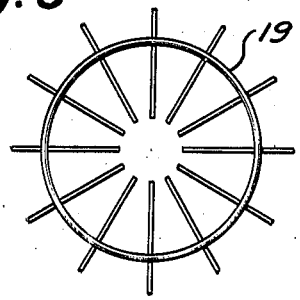
INVENTOR
PAUL H. PLANETA
BY
William A. Zalesak
ATTORNEY Patented June 6, 1944

2,350,922

UNITED STATES PATENT OFFICE 2,350,922

SUPPORT

Paul H. Planeta, Linden, N. J., assignor to Anthony Planeta, Linden, N. J.

Application October 16, 1941, Serial No. 415,231

6 Claims. (Cl. 47—35)

My invention relates to an improved form of ornamental support or holder, particularly to such a support or holder for a flower pot or the like.

A novel type of such support of recent design has the appearance of a bird cage and may contain, for example, a flower pot for holding flowers. These supports are usually made as a complete unit and as a result require a large amount of space for shipment which is costly. In order to permit insertion of the container or pot being supported, for example a flower pot with flowers, it is necessary to provide an extra large door in the side of the cage which results in complicating the structure and hence increasing its expense. Inserting a pot with a flower through the door also subjects the plant to injury by breaking when it is placed within the support. A second method of providing entry into the cage is to provide a separate sheet metal bottom which may be removed. To insert the pot and replace the bottom is a difficult operation. Providing a separate bottom increases costs and complicates construction. With a separate bottom it is necessary to have two types of materials available, that is rod-like material for the cage and also sheet metal for the bottom support. This increases the number of parts and adds to the expense of construction.

It is, therefore, a principal object of my invention to provide an ornamental support or holder of the so-called bird cage type of improved and simplified design.

Is it another object of my invention to provide an ornamental support or holder of the type described which will require small space for shipment.

A further object of my invention is to provide such an ornamental support in which the container or pot may be easily inserted and without the danger of injury to the plant in the container or pot.

Another object of my invention is to simplify the design of such a device, whereby the door as well as the separate bottom may be eliminated and so that the device may be made of one kind of material, for example completely of wire or rods.

These and other objects will become apparent in the description of the invention below.

The novel features which I believe to be characteristic of my invention are set forth with particularity in the appended claims, but the invention itself will best be understood by reference to the following description taken in connection with the accompanying drawing in which Figure 1 is a side elevation view of an ornamental support made according to my invention, Figure 2 is a bottom end view of Figure 1, Figure 3 is an enlarged section showing details of construction, Figure 4 is a section taken along the line 4—4 of Figure 1, and Figures 5, 6 and 7 show steps in the manufacture of a device made according to my invention.

Referring to Figure 1, the ornamental support in the form of a bird cage enclosure consists of two sections, an upper section 10 and lower section 11. Referring first to the top section, it comprises spaced rim or ring members 12—13 having extending between them the rod-like elements 14, the upper ends of which are bent around the ring member 13 to lie radially in a common plane transverse to the axis of the cage. One of the elements 14 may be extended as at 16 to provide an inverted V-shaped supporting element engaged by a bracket 17 when hung in position. It is understood that the V-shaped supporting element could be a separate element.

The lower section of the support or holder is made much like the top section and comprises the spaced rim or ring elements 18 and 19 having extending between them the rod-like elements 20, the lower free ends of which are bent to extend radially inward in a common plane to form a supporting base for a container, such, for example, as a flower pot 23 or the like. The two larger rim members 12 and 18 are positioned in registering contact and maintained in locked arrangement by means of the locking elements 22 which may be flexibly deformable strip members as best shown in Figures 3 and 4.

Thus in shipment the two sections may be separated from each other and shipped in nested arrangement, thereby requiring small space in comparison to the conventional type devices of this kind, it being possible to assemble the same after the shipment has reached its destination. Because of the fact that the two sections may be easily separated or joined together any container such as a flower pot or the like may be placed within the lower section without danger of breaking any portion of the flower or the like. The two parts may then be assembled together. The construction eliminates the need for a door in the side, thus simplifying the construction and decreasing the cost. It also eliminates the necessity for having two types of raw material available for construction, such as both rod-like elements and sheet metal.

A device of the kind described may be assembled according to my invention as shown in Figures 5, 6 and 7. The rod-like elements 20 are positioned radially about a common center in a common plane, the inward radial movement being limited by contact of the inner ends of the rod-like elements 20 against a mandrel, for example, 20' so that the ends of the rod-like elements terminate on a common circle. In this position the ring element 19 may be placed over the rods and coaxially with the rods and secured to the same by means of, for example, welding. The ring is then fixed in position and the rod-like elements 20 bent upwardly to lie in vertical planes passing radially through the common center of the rod-like elements, this for example being illustrated in Figure 7. After the rods are bent to shape the top ring 18 is secured to the top ends of the rods to form the bottom truncated or cup-shaped section shown in Figure 1.

The upper section may be formed in the same manner, the rod-like element having a V-shaped supporting section 16 being secured after forming of the other elements.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A support for a container and including top and bottom sections, each section including a pair of spaced rim members, one of said rim members being larger than the other, rod-like elements extending between the rim members of each section, the ends of said rod-like elements extending beyond and inwardly of the smaller rim members, and means comprising releasable fastening members for securing the larger rim members of each section together, the ends of said rod-like elements extending beyond and inwardly of the smaller rim member of the bottom section extending inwardly and radially in a common plane to provide a bottom support for said container.

2. A support for a container including top and bottom sections, each section comprising a pair of spaced ring members, one of said sections forming the bottom and including a plurality of rod-like elements extending between the ring members of the section, the rod-like elements contacting the smaller ring member forming fingers extending inwardly and radially in a common plane to form a bottom support for said container, the other section forming the top of said support and including a pair of spaced ring members, one of said ring members being of larger diameter than the other, and rod-like elements extending between the rim members of said other section, one of said rod-like members extending above the smaller ring member to provide an inverted V-shaped support element, the larger ring members of each section being in registering contact, and flexible deformable strips wrapped around the contacting ring members for maintaining the top and bottom sections together.

3. A support for a container including top and bottom sections, each section comprising a pair of spaced ring members, one of said sections forming the bottom and including a plurality of rod-like elements extending between the ring members of the section, the rod-like elements contacting the smaller ring member being bent inwardly and radially to form fingers lying in a common plane to provide a bottom support for the container, the other section forming the top of said support and including a pair of spaced ring members, one of said ring members being of larger diameter than the other, and rod-like elements extending between the rim members of the other section, the larger ring members of each section being in registering contact and flexible deformable strips wrapped around said larger ring members for maintaining the top and bottom sections together.

4. A support for a container including top and bottom sections, each section comprising a pair of spaced ring members, one of said sections forming the bottom and including a plurality of rod-like elements extending between the ring members of the section, the rod-like elements contacting the smaller ring member being formed to extend inwardly and radially in a common plane to provide a bottom support for a container, the other section forming the top of said support and including a pair of spaced ring members, one of said ring members being of larger diameter than the other, and rod-like elements extending between the ring members of said other section, one of said rod-like members extending above the smaller ring member to provide an inverted V-shaped support element, the larger ring members being in registering contact and flexible deformable strips wrapped around said larger ring members for maintaining the top and bottom sections together, and a removable container positioned within the bottom section and supported on the radially extending rod-like elements.

5. A support for a container including top and bottom sections, each section containing a pair of rim members, rod-like members extending between the rim members of each section, the rod-like elements of each section extending beyond and inwardly of one of the rim members of the section to provide a cup-shaped section the inwardly extending portions of said rod-like elements lying in a plane, the other rim members of each section being in registering contact, and flexible deformable strips wrapped around and securing said contacting rim members together.

6. A support for a container including a top and bottom section, the bottom section comprising a pair of spaced ring members of different diameters, a plurality of rod-like elements extending between the ring members, the free ends of the rod-like elements contacting the smaller ring member being formed to extend inwardly and radially in a common plane to provide a bottom support for a container, the top section forming the top of said support and including a pair of spaced ring members, one of said ring members being of larger diameter than the other, rod-like elements extending between the ring members of said top section, the free ends of the rod-like elements at the smaller diameter ring member being formed inwardly and radially of the smaller diameter ring member, and an inverted V-element secured to the smaller diameter ring member for engaging a supporting bracket, the larger ring members being in registering contact and flexible deformable locking strips wrapped around said larger ring members for maintaining the top and bottom sections together.

PAUL H. PLANETA.